United States Patent [19]

Igarashi

[11] Patent Number: 5,143,217
[45] Date of Patent: Sep. 1, 1992

[54] TAPE-CARTRIDGE CASE WITH THIN, SINGLE LAYER SIDE WALL FOR READING UPC CODE

[75] Inventor: Tadao Igarashi, Miyagi, Japan
[73] Assignee: Sony Corporation, Tokyo, Japan
[21] Appl. No.: 649,913
[22] Filed: Feb. 1, 1991

[30] Foreign Application Priority Data

Feb. 2, 1990 [JP] Japan ................................ 2-9785[U]

[51] Int. Cl.⁵ .......................................... B65D 85/672
[52] U.S. Cl. ................................ 206/387; 206/459.5; 220/662
[58] Field of Search ................ 206/387, 459; 220/662, 220/665

[56] References Cited

U.S. PATENT DOCUMENTS

| | | |
|---|---|---|
| 4,293,266 | 10/1981 | St Lawrence et al. ......... 206/387 X |
| 4,469,225 | 9/1984 | Takahashi ..................... 206/387 |
| 4,545,483 | 10/1985 | Shiba et al. ................... 206/387 |
| 4,778,051 | 10/1988 | Schaub et al. ................. 206/387 |
| 4,784,264 | 11/1988 | Sykes ........................... 206/387 |
| 4,789,058 | 12/1988 | Blaney ......................... 206/387 X |
| 4,865,195 | 9/1989 | Brands .......................... 206/387 |
| 4,867,906 | 11/1990 | Morello et al. ................ 206/387 |

*Primary Examiner*—Paul T. Sewell
*Assistant Examiner*—BethAnne C. Cicconi
*Attorney, Agent, or Firm*—Lewis H. Eslinger; Jay H. Maioli

[57] ABSTRACT

A tape-cartridge case comprises a lower plate, an upper plate and side walls projecting from the respective lower and upper plates, and when a tape cartridge is accommodated in the case, side surfaces of the tape cartridge are surrounded by the two side walls. However, only one of the two side walls opposes to a bar code that is provided on the side surface of the tape cartridge, so that the bar code can quickly and accurately be read by a bar-code reader through the single side wall.

5 Claims, 9 Drawing Sheets

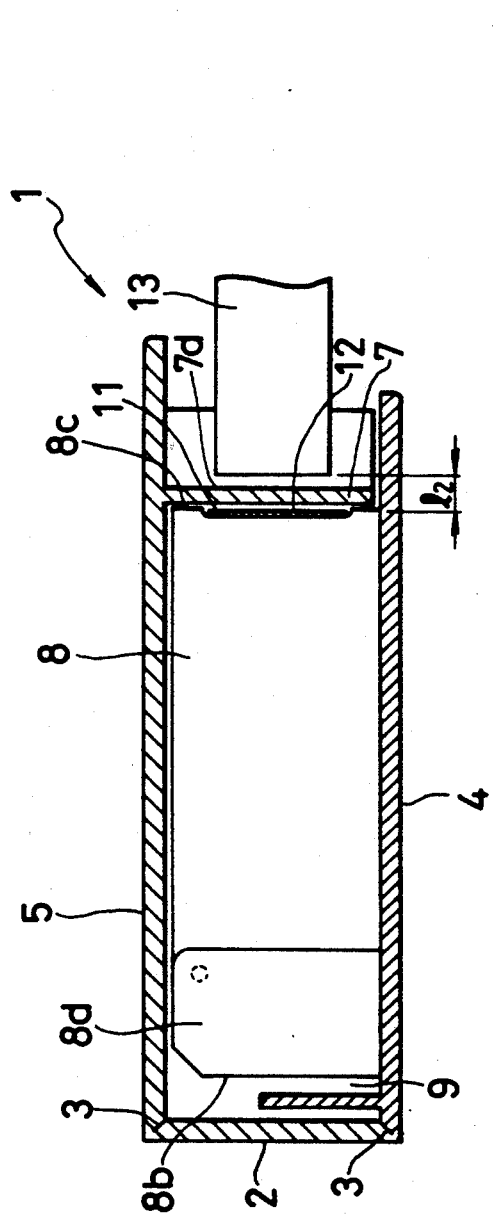
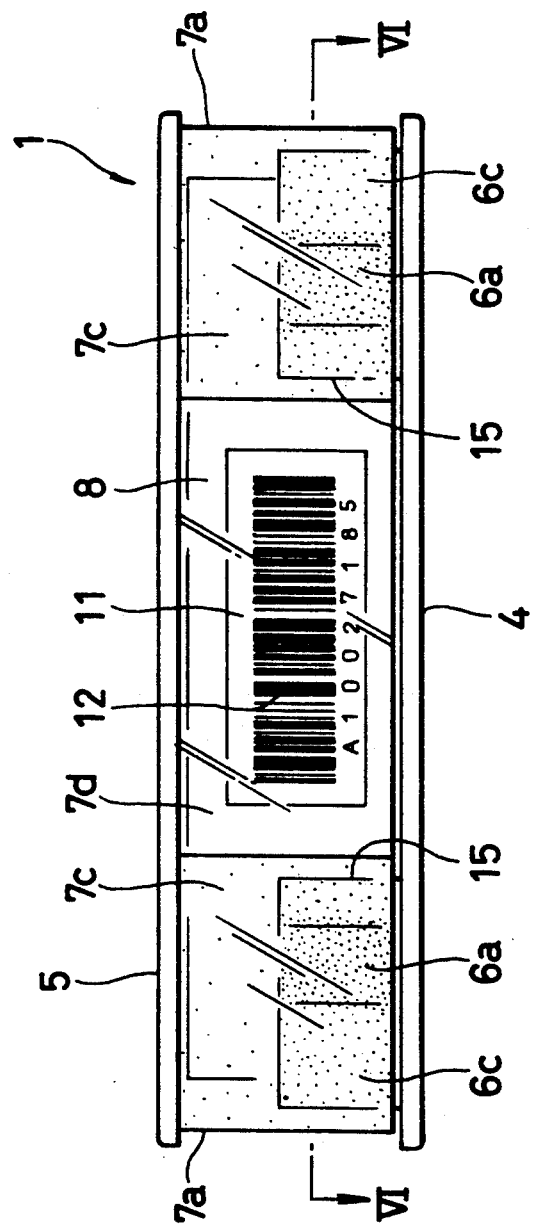
FIG. 7
FIG. 8

TAPE-CARTRIDGE CASE WITH THIN, SINGLE LAYER SIDE WALL FOR READING UPC CODE

BACKGROUND OF THE INVENTION

1. Field of the Invention

This invention relates to a tape-cartridge case, for example, for a video-tape cartridge, through a transparent part of which a bar code provided at a side of the tape cartridge is directly readable from outside the case with a bar-code reader.

2. Description of the Related Art

Previously proposed tape-cartridge cases are disclosed, for example, in U.S. Pat. Nos. 4,054,206 and 4,231,474. A tape-cartridge case 1 of those kinds comprises, as shown in FIGS. 9 and 10, an upper plate 5, a lower plate 4, a connecting plate 2, which connects the upper plate 5 to the lower plate 4 through a pair of hinges 3, a U-shaped side wall 7 projecting upwards in FIG. 10 from the upper plate 5, and a rectangular side wall 6 similarly projecting upwards in FIG. 10 from the lower plate 4. The case 1 is made of transparent synthetic resin and the hinge 3 comprises a V-notch.

As shown in FIGS. 9 and 10, a tape cartridge 8 is fitted into the rectangular side wall 6 to be horizontally set on the lower plate 4. To prevent the tape cartridge 8 from rattling in the rectangular side wall 6, a plurality of inwardly projecting portions 6a are provided near or at the corner of the rectangular side wall 6 so as to be brought into contact with four side surfaces of the tape cartridge 8, right and left side surfaces 8a, a front side surface 8b and a rear side surface 8c.

As a result, there are formed a plurality of spaces 9 enclosed by the side surface 8a, 8b, 8c of the tape cartridge 8, the inside of the rectangular side wall 6, and the inwardly projecting two portions 6a of the rectangular side wall 6, which are adjacent to each other. Height $H_1$ of the rectangular side wall 6 is about one-half of the height $H_2$ of the tape cartridge 8, and height $H_3$ of the U-shaped side wall 7 is substantially the same as the height $H_2$ of the tape cartridge 8.

As shown in FIGS. 11 and 12, the upper plate 5 is fold about the pair of hinges 3 and placed in a position parallel with the lower plate 4 just over the lower plate 4. At that time, the U-shaped side wall 7 is overlaid upon the rectangular side wall 6 from outside the rectangular side wall 6, and a pair of pawls 10 (FIG. 9) formed integrally with the U-shaped side wall 7 on the inside thereof are engaged with the outer recess of the rectangular side wall 6 as shown in FIG. 12.

As shown in FIGS. 11 to 13, a bar code 12 is printed, or a bar-code lable 11 is adhered to the right and left side surfaces 8a of the tape cartridge 8, and the bar code 12 is read from outside the tape-cartridge case 1 by a bar-code reader 13 through either a right or left portion 6b of the rectangular side wall 6 and right or left portion 7a of the U-shaped side wall 7. That is, a laser beam emitted by the bar-code reader 13 is reflected on the bar code 12, and then, the reflected beam strikes on the surface of the bar-code reader 13, so that the bar code 12 is read by the bar-code reader 13.

Selected as a material for the tape-cartridge case 1 of this kind a transparent synthetic resin, which is generally does not transmit light well, but is weatherproof and offers resistance against fatigue in the hinges 3. Moreover, in the previously proposed tape - cartridge case 1, the bar code 12 is read by the bar-code reader 13 through double side walls, through not only the portion 6b of the rectangular side wall 6 but also the portion 7a of the U-shaped side wall 7, so that it is rather difficult to read the bar code 12 because of interference by the doubly overlaid side walls 6 and 7.

In addition, there is the gap 9 between the side surface 8a of the tape cartridge 8 and the inside of the rectangular side wall 6, so that even if the bar-code reader 13 is pressed against the portion 7a of the U-shaped side wall 7 as shown in FIG. 13, there remains a large distance $l_1$ between the end of the bar-code reader and the bar code 12.

Thus, in the previously proposed tape-cartridge case 1, reading the bar code 12 by means of the bar-code reader 13 is difficult and time consuming.

OBJECTS AND SUMMARY OF THE INVENTION

Accordingly, it is an object of the present invention to provide a tape-cartridge case, two side walls of which are overlaid upon each other to surround side surfaces of a tape cartridge when the cartridge is accommodated within the case, but only one of whose two side walls lies in opposed relation to a bar code that is provided on the side surface of the tape cartridge, so that the bar code can quickly and accurately be read by a bar-code reader through only a single side wall.

Another object of the invention is to provide a tape-cartridge case having a window in one of two side walls overlaid upon each other is which lies in opposed relation to a bar code that is provided on a side surface of a tape cartridge, so that a single side wall lies between the bar code and a bar-code reader. Thus, it is possible to make the structure of the case simple and the production of the case easy, while maintaining an airtight closure.

A further object of the invention is to provide a tape-cartridge case, as aforesaid, in which a projection is provided in the other of the two side walls and fitted into the window so as to be placed adjacent to the bar code of the tape cartridge, so that the bar code can quickly and accurately be read by the bar-code reader due to the decrease in distance between the bar code and the bar-code reader.

Still a further object of the invention is to provide a tape-cartridge case, as aforesaid, in which a combination of the window of one of the two side walls and the projection of the other side wall are opposite the bar code of the tape cartridge, the bar code being provided on at least one of three side surfaces, right and left side surfaces and rear surface, so that the bar code can quickly and accurately be read by the bar-code reader wherever the bar code is provided.

In accordance with an aspect of this invention, a tape-cartridge case, in which a tape cartridge is accommodated, is made of transparent synthetic resin and comprises a lower plate; an upper plate similar in shape to the lower plate; a connecting plate for connecting the lower plate to the upper plate through two hinges provided on both sides thereof; a first side wall projecting from the lower plate to surround the accommodated tape cartridge; a second side wall projecting from the upper plate to surround the first side wall from when the upper plate is folded on the two hinges, to a position where the upper plate is parallel the lower plate; and a window provided in one of the side walls, wherein a bar code provided on a side surface of the tape cartridge rightly faces the window so that a single side wall to lies between the bar code and a bar-code reader when the tape cartridge is fitted into the first side wall and set on the lower plate, and the second side wall then surrounds the first side wall.

In a preferred embodiment of this invention, the window provided in the first side wall that lies inside of the second wall when the tape-cartridge is closed.

Furthermore, a projection is provided in the second side wall and fitted into the window in the first side wall so as to be placed adjacent the bar code of the tape cartridge.

Moreover, a combination of the window in the first side wall and the projection of the second side wall is provided in opposed relation to the bar code of the tape cartridge, the bar code being provided on at least one of three side surfaces, right and left side surfaces and rear side surface.

The above, and other objects, features and advantages of this invention, will be apparent from the following detailed description of illustrative embodiments thereof to be read in connection with the accompanying drawings, wherein like reference numerals identify the same or corresponding parts in the several views.

BRIEF DESCRIPTION OF THE DRAWINGS

FIG. 7 is a sectional view taken along the line VII—VII on FIG. 6;

FIG. 8 is a side view, viewed along a direction of arrows VIII on FIG. 6, of a tape-cartridge case according to another embodiment of this invention;

DETAILED DESCRIPTION OF PREFERRED EMBODIMENTS

A tape-cartridge case embodying this invention will be described in regard to FIGS. 1-5, throughout which like parts are referred to by like references, which have been used in FIGS. 9-13.

Figure 3:
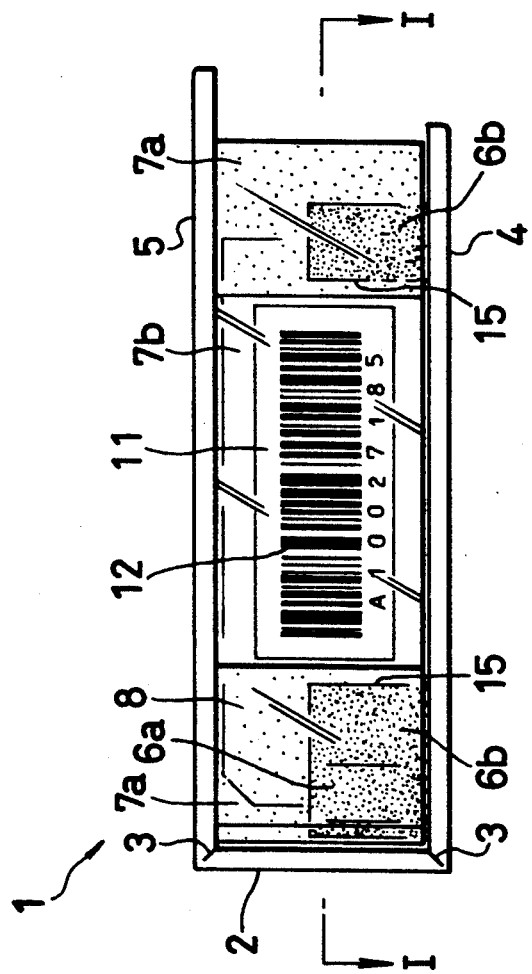
FIG. 3 is a side view, viewed along a direction of arrows III on FIG. 1, of a tape-cartridge case according to an embodiment of this invention.
Figure 4:
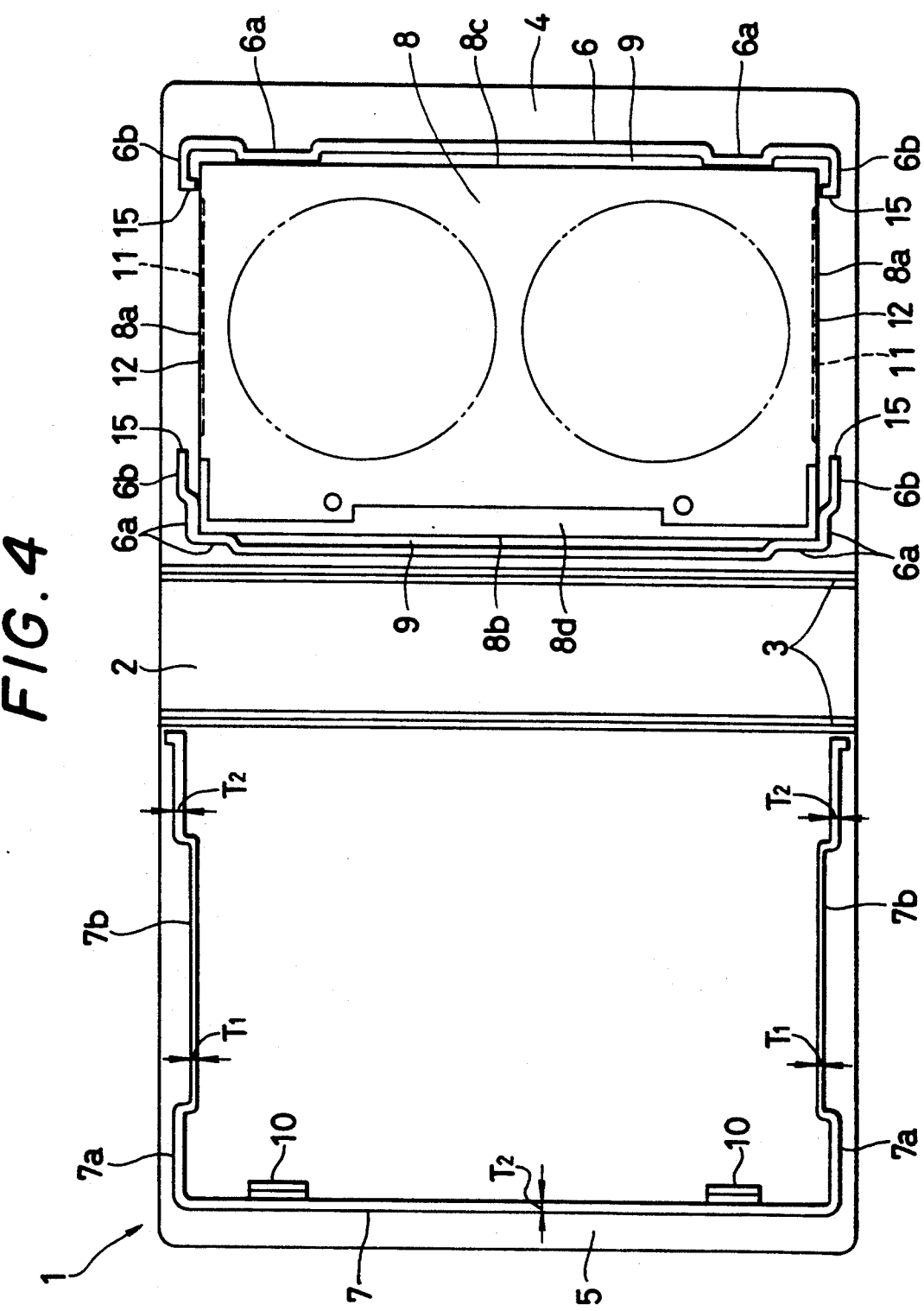
FIG. 4 is a plan view, shown upon developed condition, of the tape-cartridge case of FIG. 3.
Figure 5:
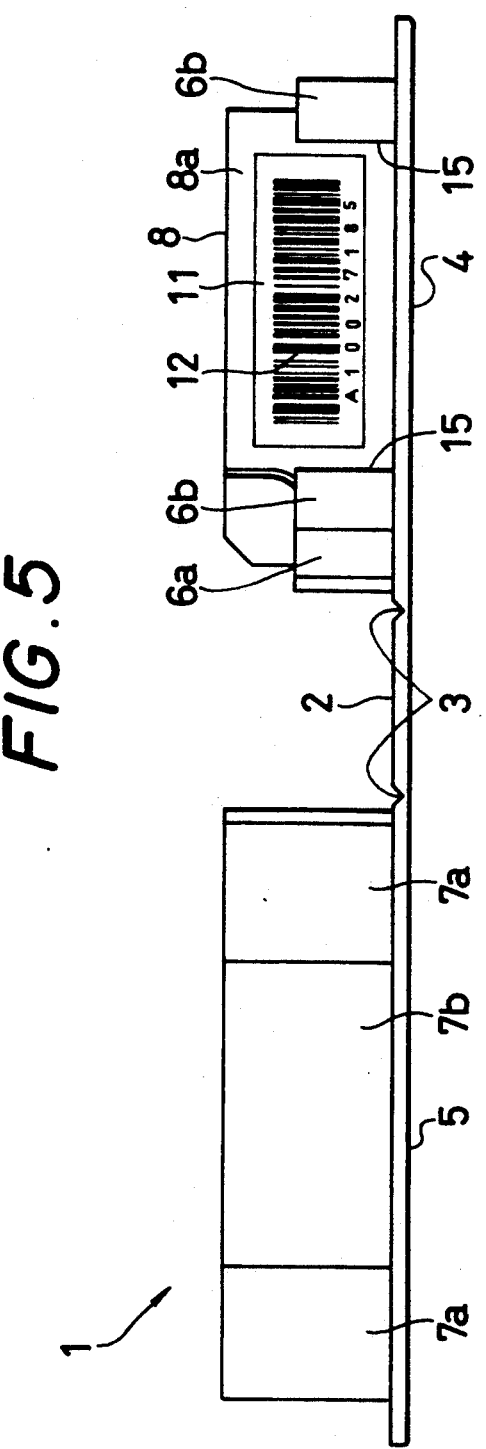
FIG. 5 is a side view of the tape-cartridge case of FIG. 4.
Figure 13:
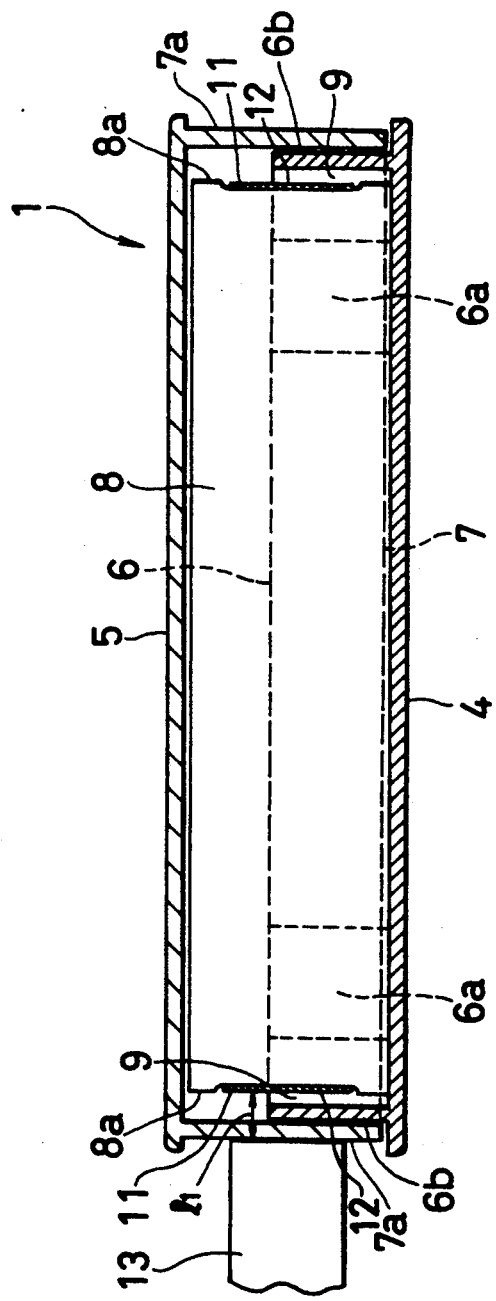
FIG. 13 is a sectional view taken along the line XIII—XIII on FIG. 12.

As shown in FIGS. 4 and 5, a first side wall 6 projecting from a lower plate 4 is partially removed in a right or left portion 6b thereof, which faces a bar code 12 provided on a right or left side surface 8a of a tape cartridge 8. A second side wall 7 projecting from an upper plate 5 is inwardly projected in a right or left portion 7a thereof, which corresponds to the removed portion 15 of the first side wall 6. The projected portion 7b shown in FIG. 4 is fitted into the removed portion 15 of the first side wall 6 and brought into contact with the side surface 8a of the tape cartridge when the upper plate 5 is folded to a position shown in FIG. 3.

Thickness $T_1$ of the projected portions 7b shown in FIG. 4 is less than thickness $T_2$ of the rest of the second side wall 7, and both surfaces of the projected portions 7b have a reflective finish to improve the transmittance of the projected portions 7b as much as possible.

Figure 1:
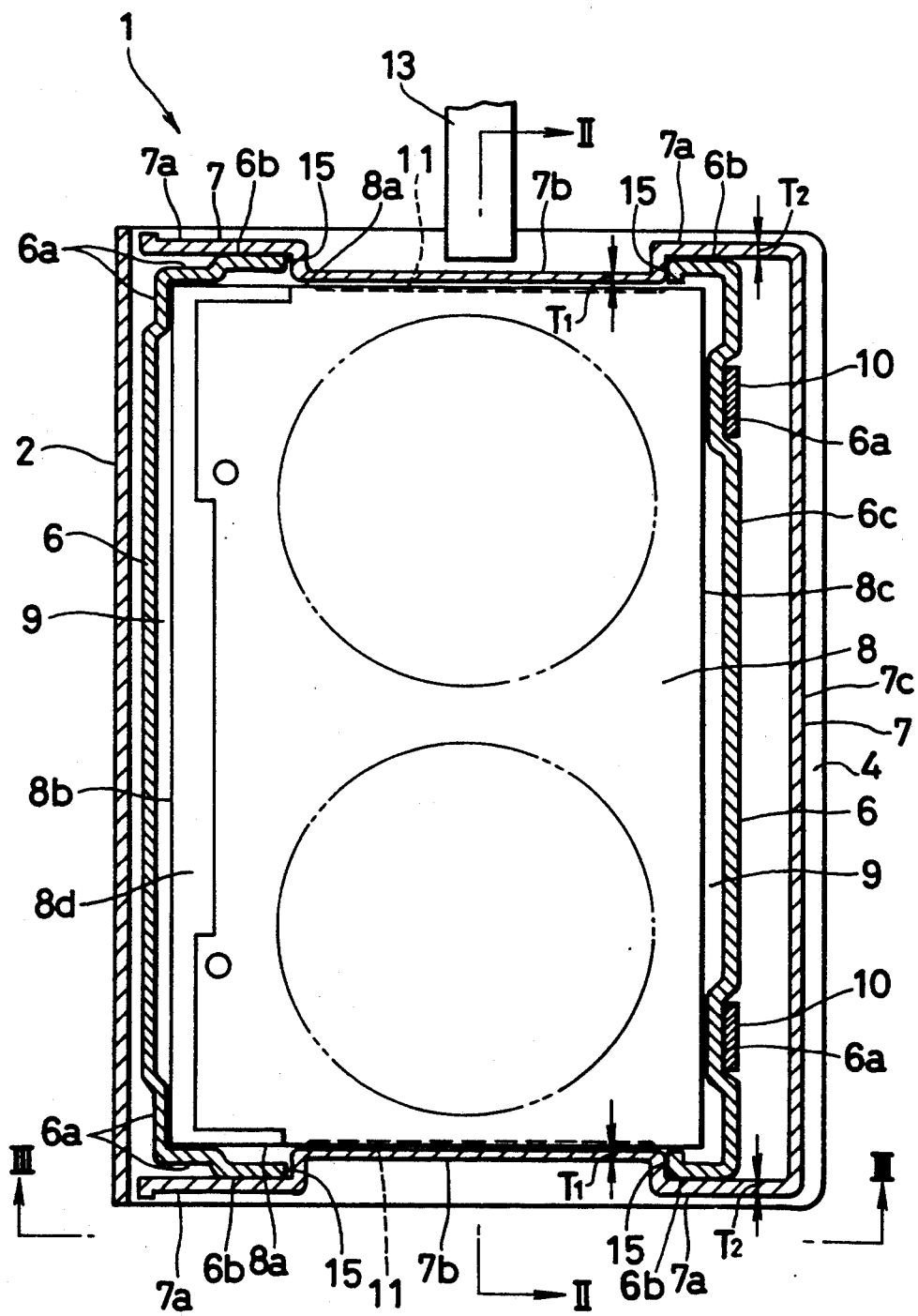
FIG. 1 is a sectional view taken along the line I—I on FIG. 3.
Figure 2:
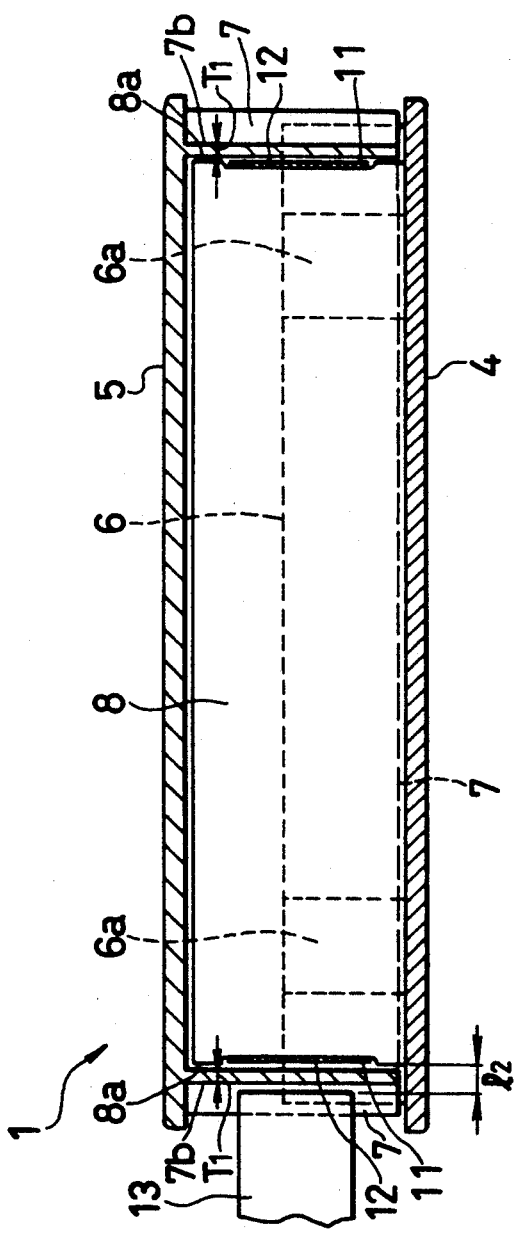
FIG. 2 is a sectional view taken along the line II—II on FIG. 1.

When the tape cartridge 8 is completely accommodated in the case 1 as shown in FIG. 1-3, the projected portion 7b comes in contact with the right or left side surface 8a of the tape cartridge 8, on which the bar code 12 has been provided, so that it is possible to set the bar-code reader 13 within a very small distance $l_2$ from the bar code 12 as shown in FIG. 2. In addition, a single side wall 7 lies between the bar-code 12 and the bar-code reader 13, and also, the transmittance of the side wall 7 is improved. Thus, it is easy to read the bar code 12 with higher accuracy and at higher speed.

Moreover, when a person holds the tape cartridge 8 between his fingers, and sets it in or takes it out from the recess defined by the side wall 6, the removed portion 15 of the side wall 6 provides direct access to the tape cartridge.

Figure 6:
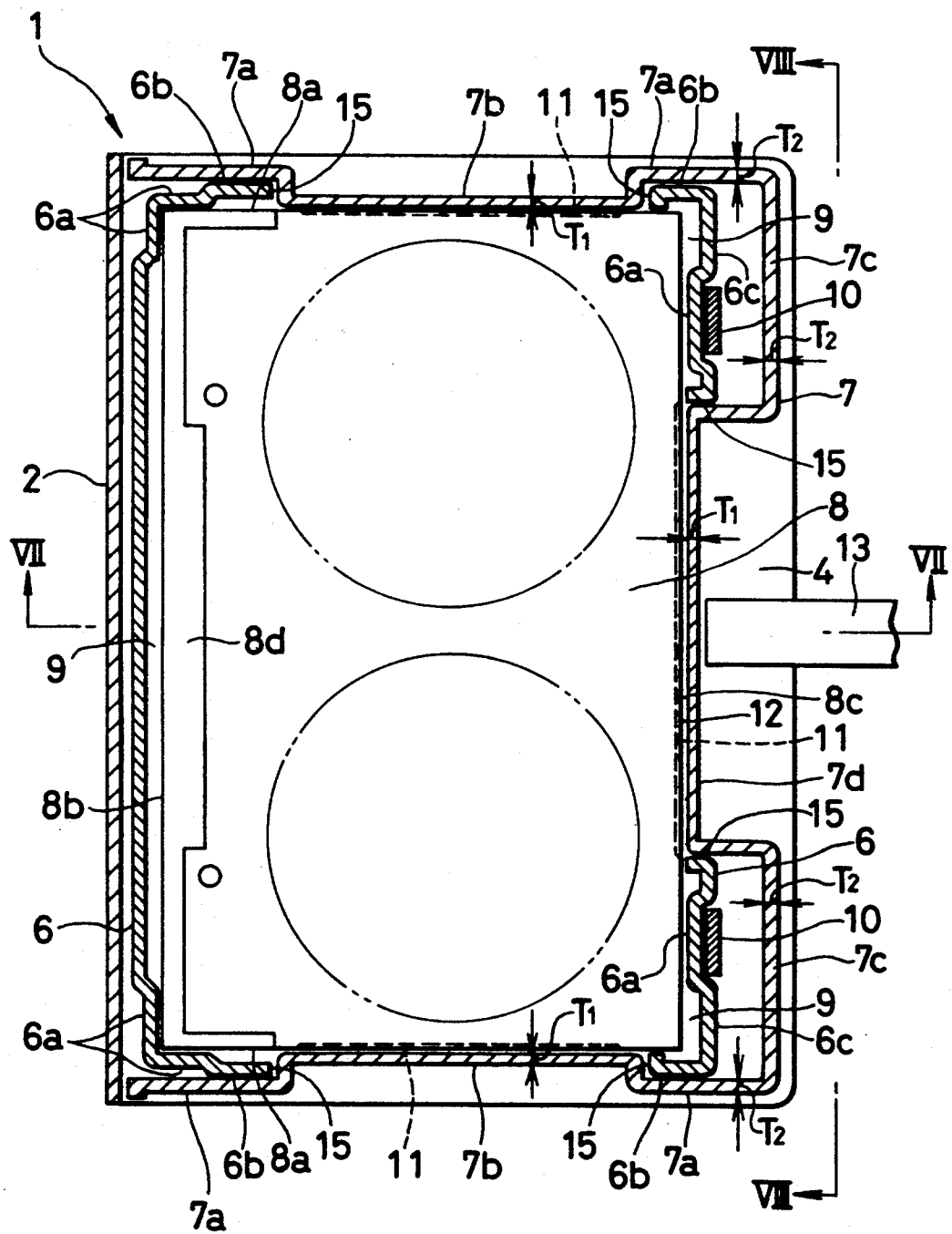
FIG. 6 is a sectional view taken along the line VI—VI on FIG. 8.
Figure 9:
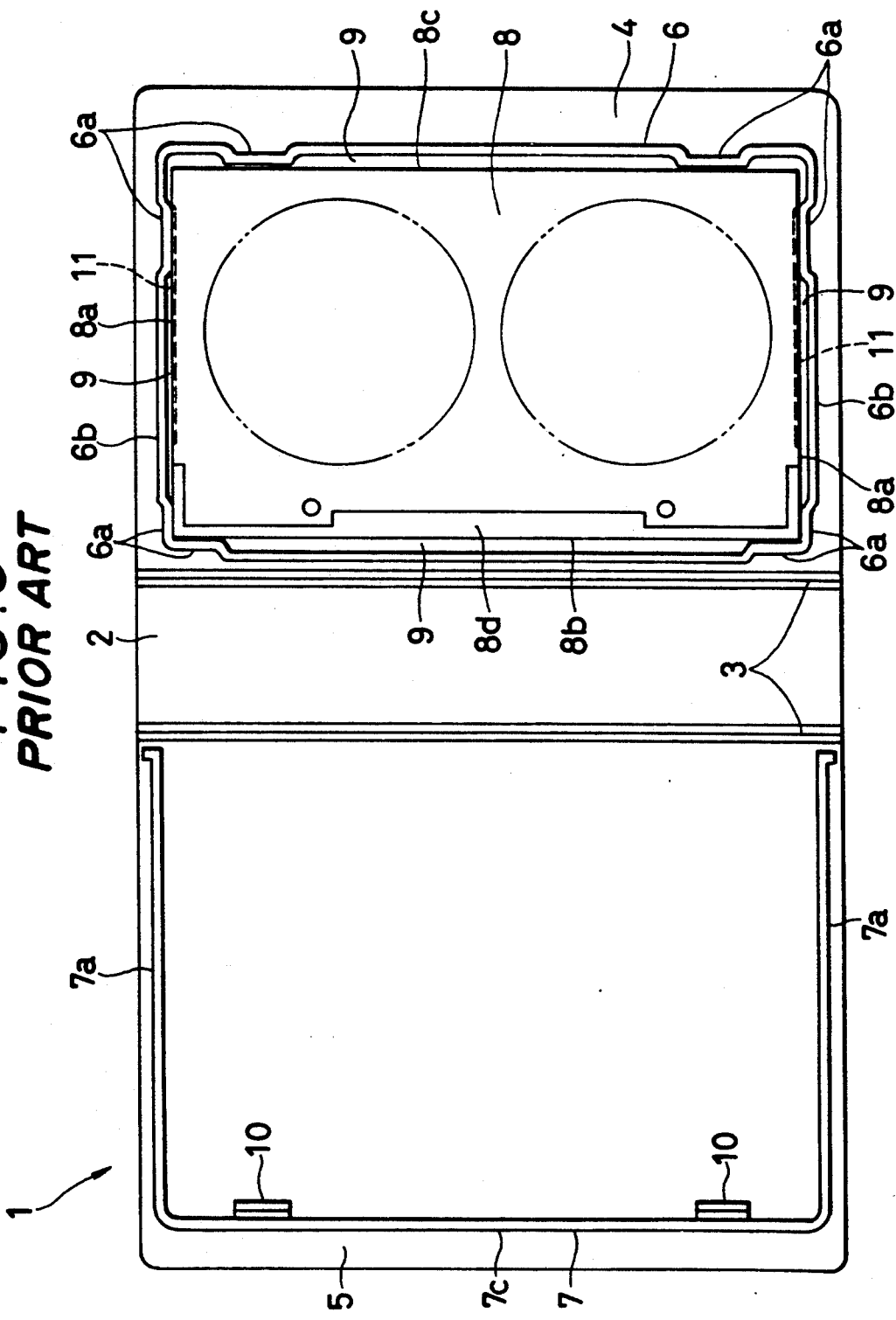
FIG. 9 is a plan view, shown upon developed condition, of a previously proposed tape-cartridge case.
Figure 10:
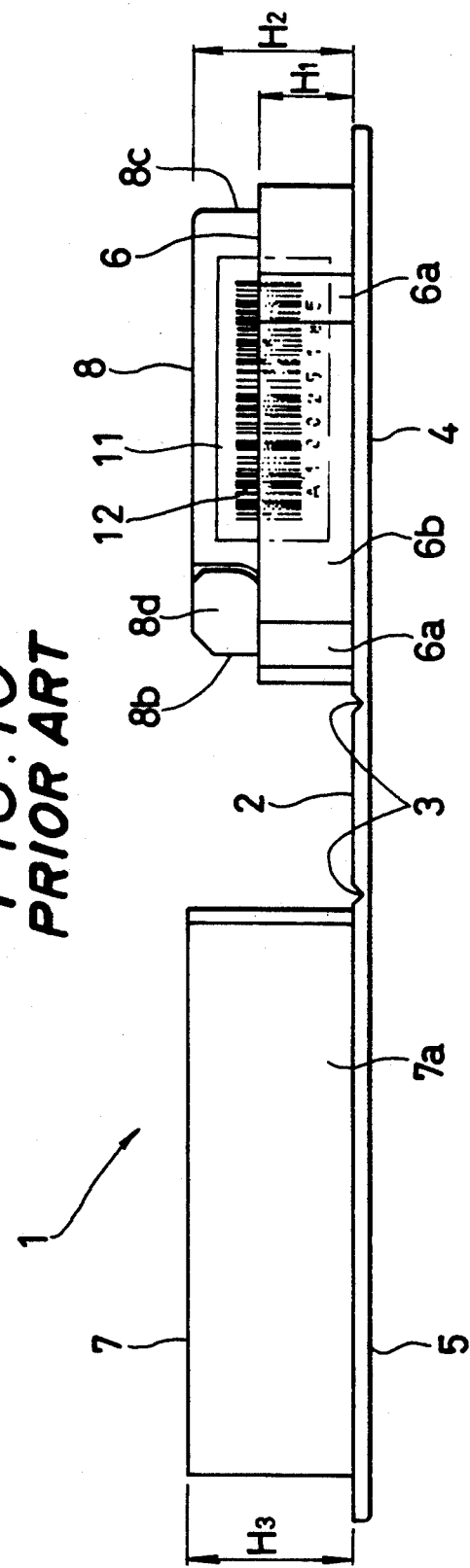
FIG. 10 is a side view of the tape-cartridge case of FIG. 9.
Figure 11:
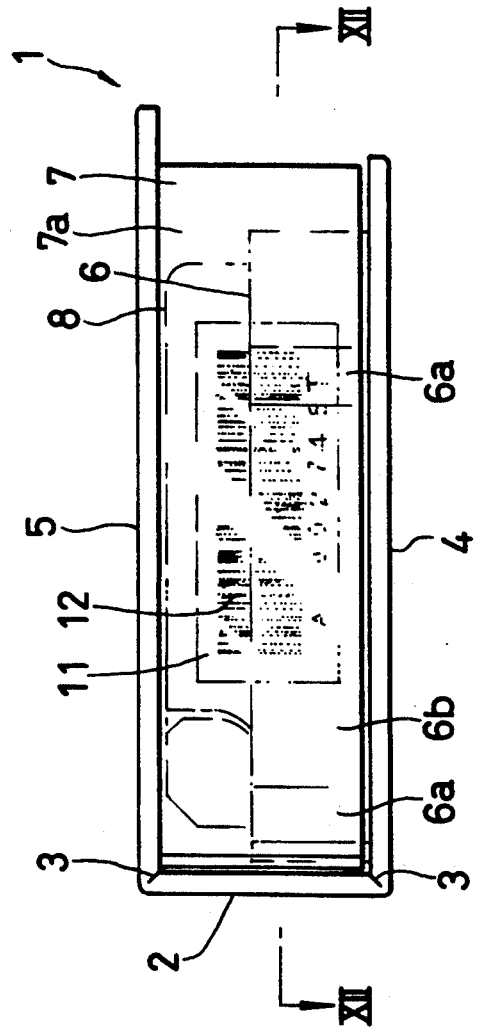
FIG. 11 is a side view, shown upon condition of a tape cartridge being accommodated, of the tape-cartridge case of FIG. 10.
Figure 12:
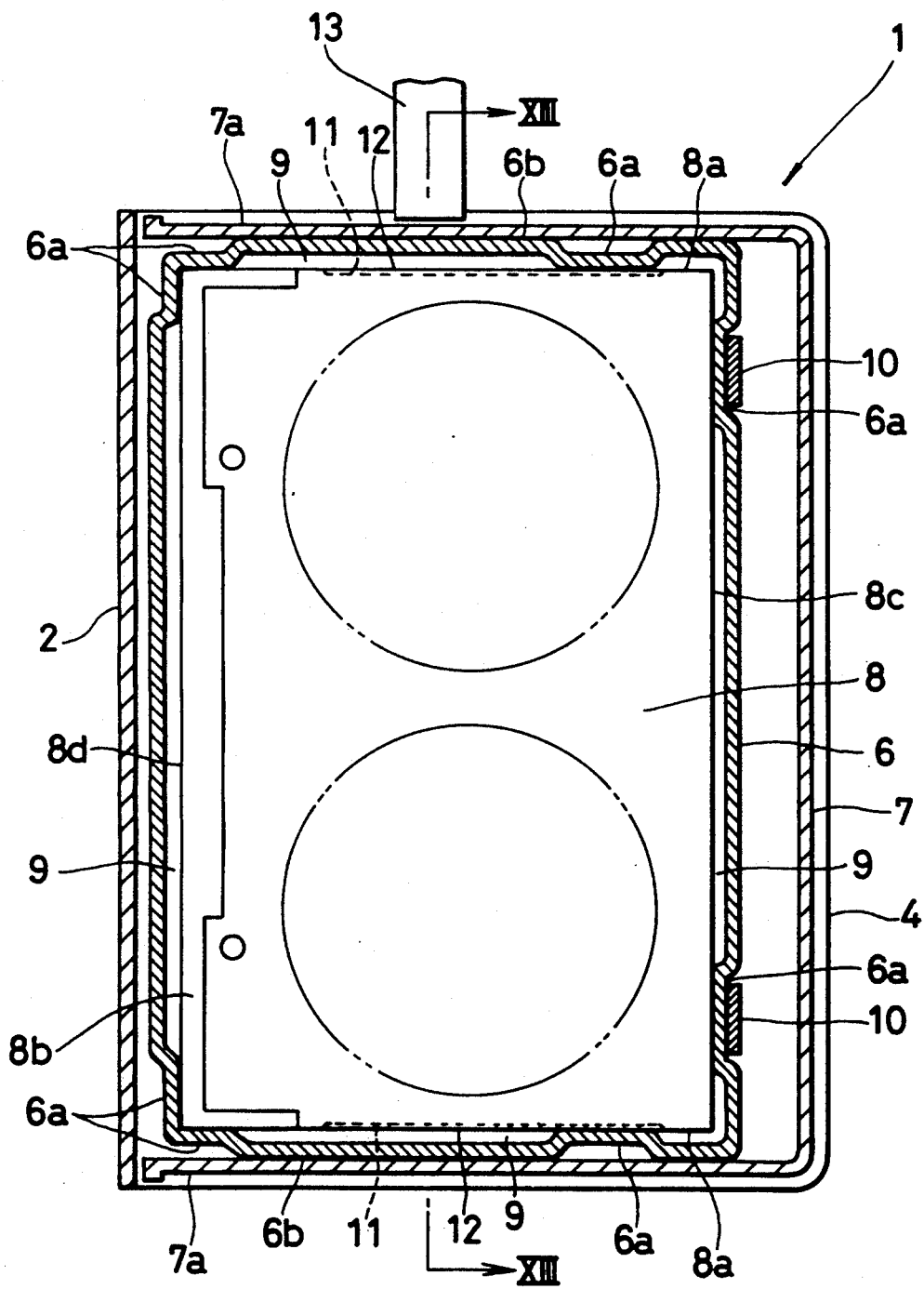
FIG. 12 is a sectional view taken along the line XII—XII on FIG. 11.

Referring to FIGS. 6-8, a second embodiment will be hereinafter described. A bar code 12 is provided on a rear side surface 8c of a tape cartridge 8. A front side surface 8b opposite to the rear side surface 8c is covered with a rotatable front lid 8d. A bar-code label 11, on which the bar code 12 has been printed, is adhered to the center of the rear side surface 8c.

As shown in FIG. 6, a first side wall 6 projecting from a lower plate 4 of a tape-cartridge case 1 is partially removed in a rear portion 6c thereof, which faces the bar code 12 of the tape cartridge 8. A second side wall 7 projecting from an upper plate 5 is inwardly projected in a rear portion 7c thereof. The projected portion 7d shown in FIG. 6 is fitted into the removed portion 15 of the first side wall 6 and brought into contact with the rear side surface 8c of the tape cartridge 8 when the upper plate 5 is folded to a position shown in FIG. 8.

Thickness $T_1$ of the projected portion 7d shown in FIG. 6 is less than thickness $T_2$ of the rest of the second side wall 7, and both surfaces of the projected portion 7d have a reflective finish to improve the transmittance of the projected portion 7d.

When the tape cartridge 8 is completely accommodated in the tape-cartridge case 1 as shown in FIG. 8, the projected portion 7d shown in FIG. 7 comes in contact with the rear side surface 8c of the tape cartridge 8, on which the bar code 12 has been provided, so that it is possible to set a bar-code reader 13 within a very small distance $l_2$ from the bar code 12 as shown in FIG. 7. In addition, a single side wall 7 lies between the bar code 12 and the bar-code reader 13, and also, the transmittance of the projected portion 7d of the second side wall 7 is improved. Thus, it is easy to read the bar code 12 with higher accuracy and at higher speed.

Having described illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

Moreover, this invention is applicable not only to a video-tape-cartridge case but also to various kinds of tape-cartridge cases.

What is claimed is:

1. A tape-cartridge case, in which a tape cartridge is accommodated, formed of transparent synthetic resin and comprising:

a lower plate;

an upper plate similar in shape to the lower plate;

a connecting plate for connecting the lower plate to the upper plate, said connecting plate having two hinges, one provided on opposite respective edges thereof;

a first side wall projecting from the lower plate to partially surround the accommodated tape cartridge;

a second side wall projecting from the upper plate to surround the first side wall in a closed position, wherein the upper plate and connecting plate are folded on the two hinges to a position where the upper plate is parallel with the lower plate; and said first side wall having a portion removed therefrom to provide an opening therein and having a first continuous wall portion adjacent an edge of said connecting plate and a second continuous wall portion opposite said first continuous wall portion and said second side wall includes a projected portion projecting inwardly toward the tape cartridge and fitting into said opening in said closed position, wherein a bar code provided on a side surface of the tape cartridge faces the opening in said first wall so that only said projected portion of said second side wall formed of transparent synthetic resin will lie between the bar code and a bar code reader when the tape cartridge is set within the first side wall on the lower plate and said second side all surrounds said first side wall.

2. A tape-cartridge case according to claim 1, wherein said projected portion of said second sidewall projecting inwardly is formed having a first thickness and remaining portions of said second sidewall have a second thickness greater than second first thickness.

3. A tape-cartridge case according to claim 2, wherein said first side wall further comprises a second opening formed in said second continuous wall portion of said first side wall and said second side wall includes a second projected portion formed in said second sidewall projecting inwardly into said second opening in said first side wall in said closed position.

4. A tape-cartridge case according to claim 2, wherein said second side wall includes an indented portion formed at a location thereof corresponding to said projected portion projecting inwardly.

5. A tape-cartridge case according to claim 2, wherein said projected portion of said second side wall project inwardly a distance to be in contact with a side surface of the tape cartridge accommodated in the tape-cartridge case.

* * * * *